(12) United States Patent
Fan

(10) Patent No.: US 6,526,142 B1
(45) Date of Patent: Feb. 25, 2003

(54) CLAMP-TO-COMBINE SOUND COLLECTOR ASSEMBLY

(76) Inventor: Eagle Fan, No. 30, Lu-Chang, Chupei City, Hsinchu Hsien (TW)

( * ) Notice: Subject to any disclaimer, the term of this patent is extended or adjusted under 35 U.S.C. 154(b) by 0 days.

(21) Appl. No.: 09/575,834

(22) Filed: May 22, 2000

(51) Int. Cl.⁷ .............................................. H04M 1/00
(52) U.S. Cl. .................... 379/420.04; 379/446
(58) Field of Search ................ 379/420.01, 420.02, 379/420.03, 420.04, 430, 428.02, 446, 447, 455, 454; 455/90, 575

(56) References Cited

U.S. PATENT DOCUMENTS 5,528,689 A * 6/1996 Chan ........................... 379/430
5,703,946 A * 12/1997 Chen ........................... 379/446

* cited by examiner

Primary Examiner—Jack Chiang

(57) ABSTRACT

A clamp-to-combine sound collector assembly mainly comprises an upper clamping arm, a lower clamping arm, a sound pickup cup, a weight block, and a spring, the sound pickup cup is disposed at a bottom portion of the front end of the upper clamping arm. The tail end of both the upper and the lower clamping arm are pivotally jointed with each other to form a pivotal joint structure for easy extending or closing the claming arms. The weight block and the spring are hidden in the pivotal joint structure for fixing and ensuring a predetermined included angle and positions of the upper and the lower clamping arm and for further adjustment of clamping tightness of the clamping arms clamped on a mobile phone set.

10 Claims, 6 Drawing Sheets

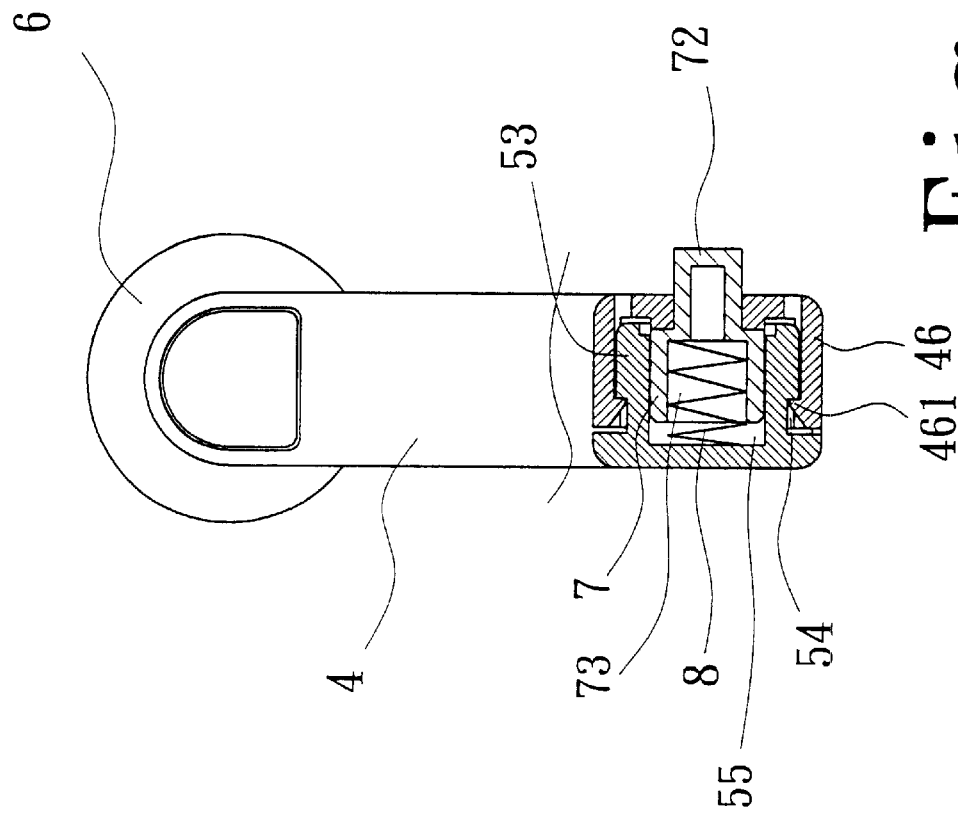

CLAMP-TO-COMBINE SOUND COLLECTOR ASSEMBLY

BACKGROUND OF THE INVENTION

1. Field of the Invention

This invention relates to sound collector, more particularly, it relates to a tightness adjustable clamp-to-combine sound collector assembly used to clamp at a mobile phone set for sound collection.

2. Description of the Prior Art

Subsequent to prevalence of the mobile phone, the hand-free mobile phone set comes after to grow like bamboo shoots.

A conventional hand-free mobile phone set shown in FIG. 1 generally comprises a fixing clamp 1, a sound-collecting deck 2, a speaker 3, etc, wherein the fixing clamp 1 takes advantage of a reed piece 11 to keep clamping tightness; a microphone is located in the sound-collecting deck 2 for picking up sound of the mobile phone set 9, then the sound is transmitted to the speaker via a cord 21 for amplification. However, some defects are found in abovesaid structure:

1. The clamping tightness of the fixing clamp controlled by the reed piece cannot be adjusted, hence, the fixing clamp doesn't work for some mobile phone sets in different thickness.

2. The clamping force of the fixing clamp is usually considered subjectively. For example, when a clamp is deemed too tight to open for a woman, it is hard to say "too tight" to a man, in other words, the fixing clamp lacks design of humanization.

3. The sound-collecting deck looks somewhat bulky because of the inside microphone.

4. Too many components require more assembling time and labor cost.

In view of abovesaid imperfection, after years of constant effort in research, the inventor of this invention has consequently developed and proposed an improved framework pertaining to the subject matter.

SUMMARY OF THE INVENTION

The primary object of this invention is to provide a clamping tightness adjustable clamp-to-combine sound collector assembly, which is mainly composed of an upper and a lower clamping arm, wherein one end of of those two clamping arms are pivotally jointed with each other to form a pivotal joint structure, wherein a weight block and a spring are disposed for controlling position and included angle of the clamping arms. A user can adjust the clamping arms to a preferable included angle and control the clamping tightness at will.

Another object of this invention is to provide a clamp-to-combine sound collector assembly with merits of easy assembling, few components, and excellent practicability.

Yet another object of this invention is to provide a clamp-to-combine sound collector assembly with beautiful appearance and small volume for promoting competition capability.

A furthermore object of this invention is to provide a clamp-to-combine sound collector assembly, wherein the clamping tightness can be adjusted easily despite of thickness of mobile phone set.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention to be made later are described briefly as follows in which:

FIG. 6 is a top view of FIG. 2 with a cross sectioned pivotal joint structure.

DETAILED DESCRIPTION OF THE PREFERRED EMBODIMENT

Figure 1:
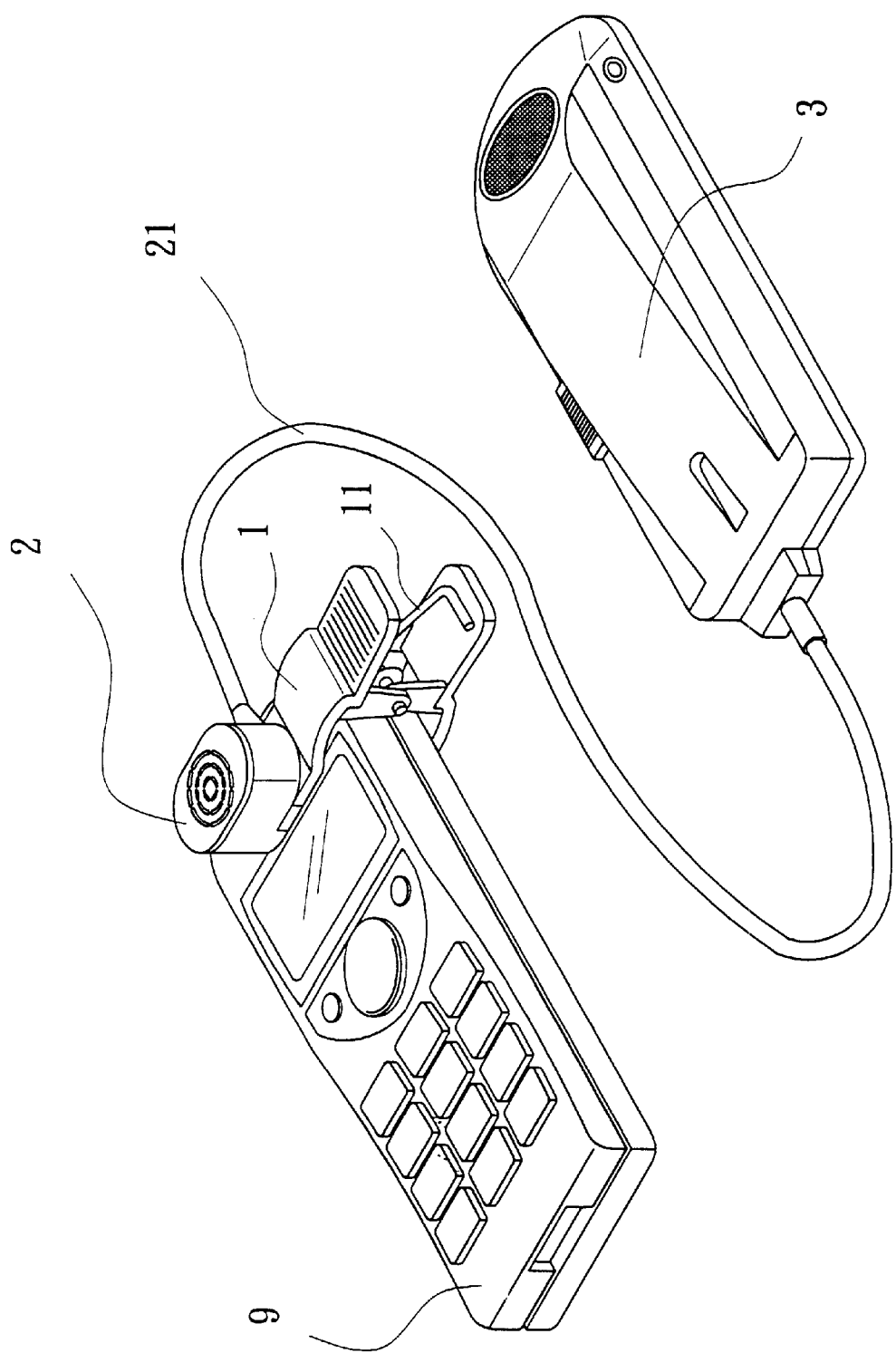
FIG. 1 is schematic view showing a conventional hand-free phone set.
Figure 2:
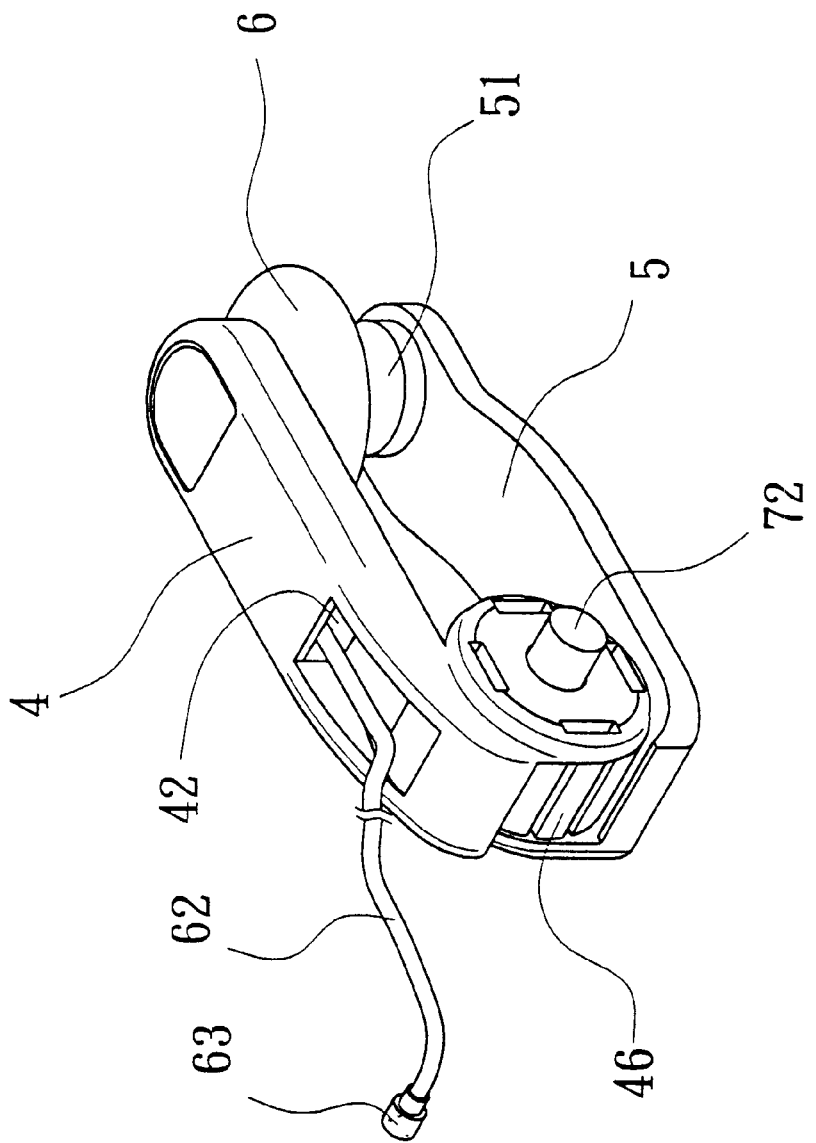
FIG. 2 is an elevational view of this invention in three dimensions.
Figure 3:
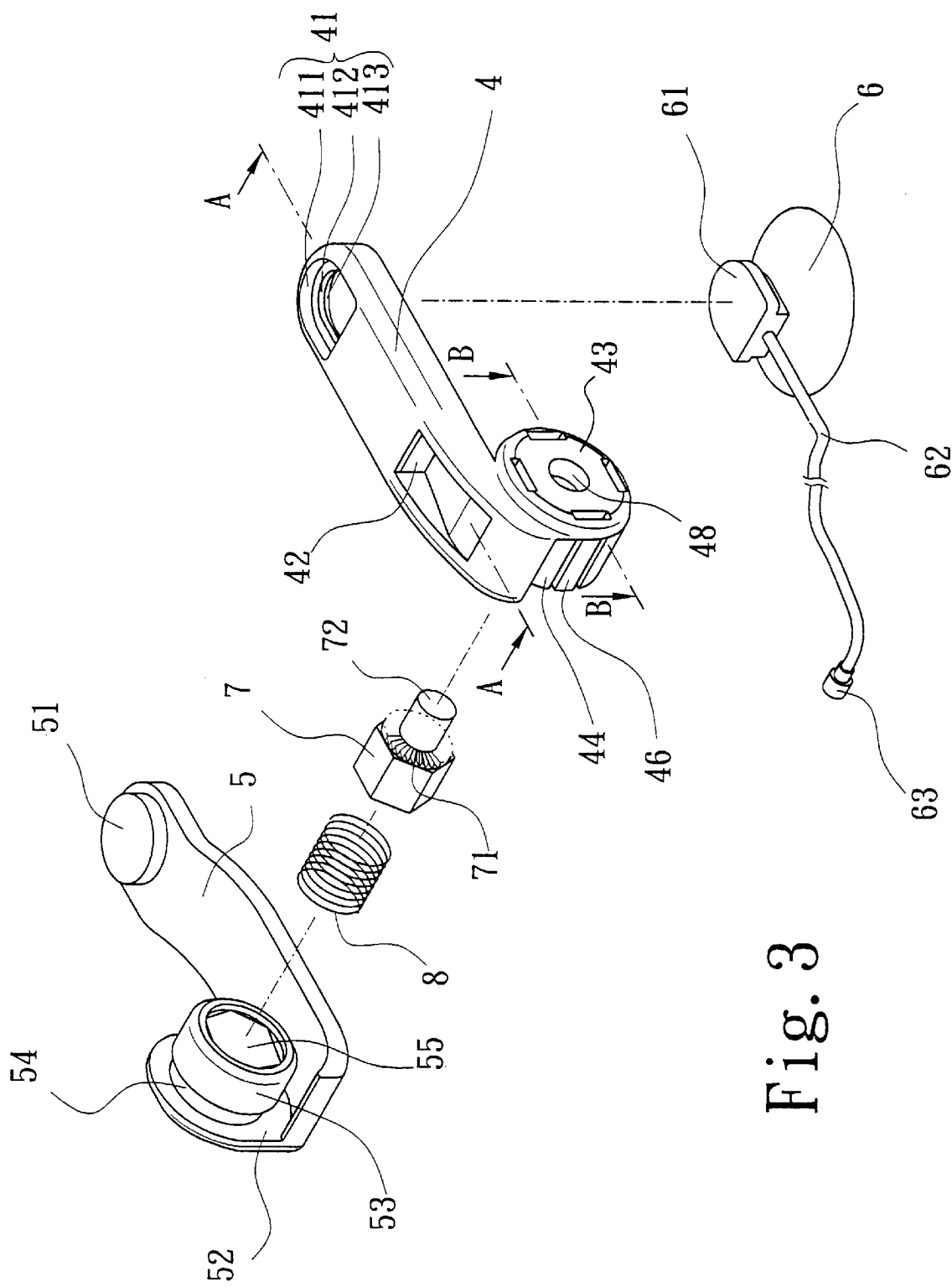
FIG. 3 is an exploded view of this invention in three dimensions.

As shown in FIGS. 2, 3—an elevational and an exploded view in three dimensions—a clamp-to-combine sound collector assembly of this invention mainly comprises an upper clamping arm 4, a lower clamping arm 5, a sound pickup cup 6, a weight block 7, and a spring 8, wherein the sound pickup cup 6 is disposed at a bottom portion of the front end of the upper clamping arm 4; the tail end of both the upper and the lower clamping arm 4, 5 are pivotally jointed with each other to form a pivotal joint structure for easy extending or closing the claming arms; and, the weight block 7 and the spring 8 are hidden in the pivotal joint structure for fixing and ensuring a predetermined included angle and positions of the upper and the lower clamping arm 4, 5, and for further adjustment of clamping tightness of the clamping arms clamped on a mobile phone set.

Figure 5:
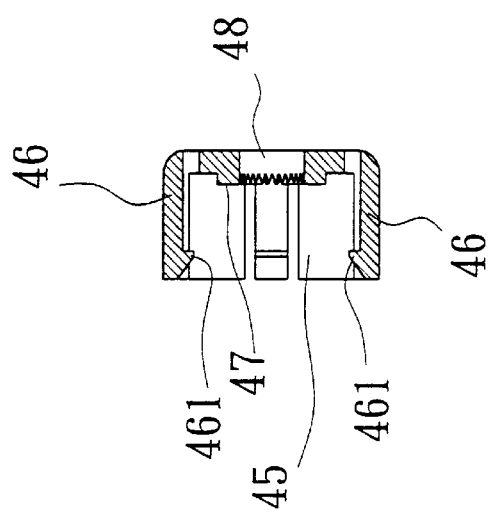
FIG. 5 is a cross-sectional view illustrating the upper clamping arm shown in FIG. 3 taken along line B—B.
Figure 4:
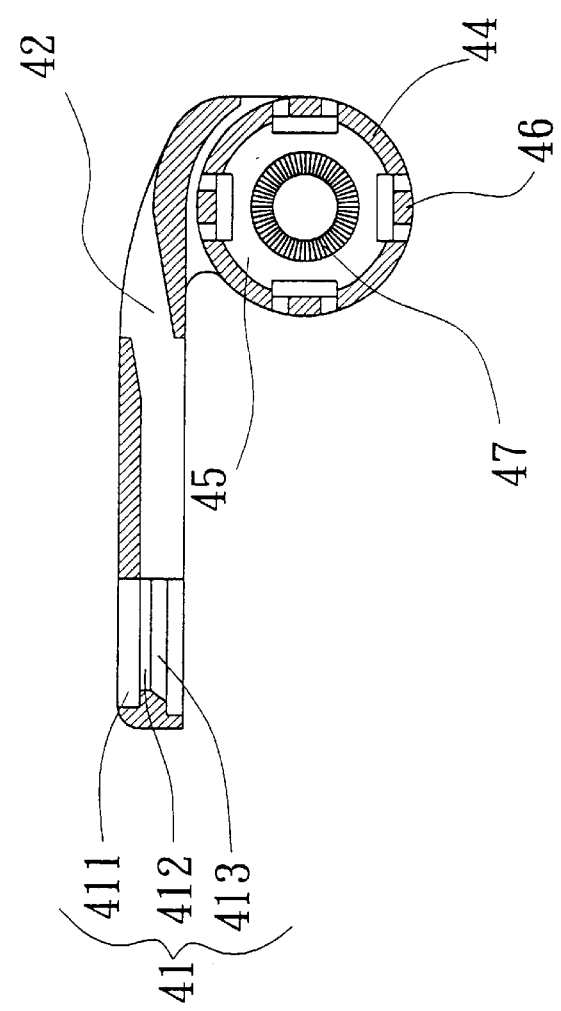
FIG. 4 is a cutaway sectional view illustrating an upper clamping arm shown in FIG. 3 taken along line A—A.

The components and interaction therewith are described below:

The main body of the upper clamping arm 4 is basically a plane plate body, wherein a slip receptacle 41 is arranged at the front end of the upper clamping arm 4 for accommodating and fixing a top portion 61 of the sound pickup cup 6. Referring to FIG. 3 and FIG. 4, the slip receptacle 41 further comprises three portions, from the top to the bottom, namely, a circular snap recess 411 in a largest scale, a neck section 412, and a conical cavity 413. The snap recess 411 is shaped correspondingly with the top portion 61 of the sound pickup cup 6, the neck section 412 is shrinked to prevent the sound pickup cup 6 from escaping, and the conical cavity 413 is tapered upwardly to match the shape of the sound pickup cup 6 and allow the latter to locate at the front end of the upper clamping arm 4 and clamp at a mobile phone set for sound collection. Moreover, in the plane plate body of the upper clamping arm 4, a penetrable wire entry 42 is arranged permitting a pipeline 62 of the sound pickup cup 6 to be extended outwardly to couple with a microphone in a speaker deck for broadcasting amplified audio signals. A fixing piece 43 is attached to a downwardly extended lateral face of the tail end of the upper clamping arm 4, and a bearing socket 44 is secured to the fixing piece 43 transversely, wherein a circular shaft receptacle 45 is formed in the bearing socket 44 (shown in FIG. 5); four discrete clamping pieces 46 are equally distributed along the circumference of the shaft receptacle 45; and a protruding quasi-triangular barb 461 is formed at tip of each clamping piece 46. This part of structure is elaborated for pivotally jointing with the lower clamping arm 5 to facilitate extending or closing of those two clamping arms. In addition, an annular tooth set 47 is aligned on the inner bottom face of the shaft receptacle 45, and a through hole 48 is reserved in the shaft receptacle 45. This part of structure is elaborated for fixing the upper and the lower clamping arm 4, 5 in place and holding the included angle thereof.

As illustrated in FIG. 3, the main body of the lower clamping arm 5 is basically an arc-curved plate body, wherein a soft bumper 51 is disposed on the front end of the lower clamping arm 5. The bumper 51, which may be made in other materials, is a sponge pad in this case for enhancement of frictional force with a mobile phone set and prevention of scratching surface of the mobile phone set. Further, an upwardly extended fixing piece 52 is attached to a lateral face at the tail end of the lower clamping arm 5, and a shaft bushing 53 is secured to the fixing piece 52 transversely, wherein the outer diameter of the shaft bushing 53 coincides with the inner diameter of the shaft receptacle 45 in the upper clamping arm 4; and, a recessed annular groove 54 is formed in the bottom rim of the shaft bushing 53. When assembling, the shaft bushing 53 is put entering the shaft receptacle 45, and the barbs 461 of the clamping pieces 46 are supposed to snap at the annular groove 54 to ensure stable combination of the upper and the lower clamping arm 4, 5, and meanwhile, this part of structure serves for a pivotal joint point allowing a user to open or close those two clamping arms smoothly. Besides, an unpenetrated polygonal store cavity 55, hexagonal in this case, is formed in center of the shaft bushing 53 for accommodating the weight block 7.

As mentioned above, the main body of the foregoing weight block 7 shown in FIG. 3 is a polygonal body, an hexagonal body in this case. In the weight block 7, an annular tooth set 71 is aligned on the right face (partly shown in FIG. 3), and a protruding part 72 is formed in center of the right end while a circular cavity 73 is recessively formed in the left end (shown in FIG. 6) for storing part of the spring 8. In assembling, the weight block 7 is disposed between the store cavity 55 of the lower clamping arm 5 and the shaft receptacle 45 of the upper clamping arm 4; two ends of the spring 8 prop against the bottom end of the store cavity 55 and the circular cavity 73 of the weight block 7 respectively to enable the annular tooth set 71 of the weight block 7 to engage with the annular tooth set 47 of the shaft receptacle 45; and, the protruding part 72 penetrates the through hole 48 and pokes outwardly. By abovesaid arrangement, under normal state, the annular tooth set 71 is engaged with the annular tooth set 47 to have the included angle between those two clamping arms fixed, and when the protruding part 72 is depressed to separate those two clamping arms, the clamping tightness can be adjusted as desired.

The main body of the sound pickup cup 6 is basically a conical hollow body, wherein the top portion 61 of the sound pickup cup 6 is a T-shaped structure connected with a hollow pipeline 62, whose tail end is connected with a relatively larger-sized cylindrical coupling 63 for plugging the microphone in the speaker deck so that sound or voice of a mobile phone set can be gathered and transmitted to the microphone via the pipeline 62, then processed and broadcasted through the speaker.

In short, the assembling procedure is rather simple, including: pressing the spring 8, then the weight block 7 in sequence with slight force in the store cavity 55 of the lower clamping arm 5; aiming the shaft bushing 53 at the shaft receptacle 45 of the upper clamping arm 4, then pressing them together, as shown in FIG. 6; snapping the barbs 461 of the clamping pieces 46 at the annular groove 54 to fix the integral structure; and finally, pressing the sound pickup cup 6 onto the slip receptacle 41 of the upper clamping arm 4 to have the procedure completed (shown in FIG. 2).

Figure 7:
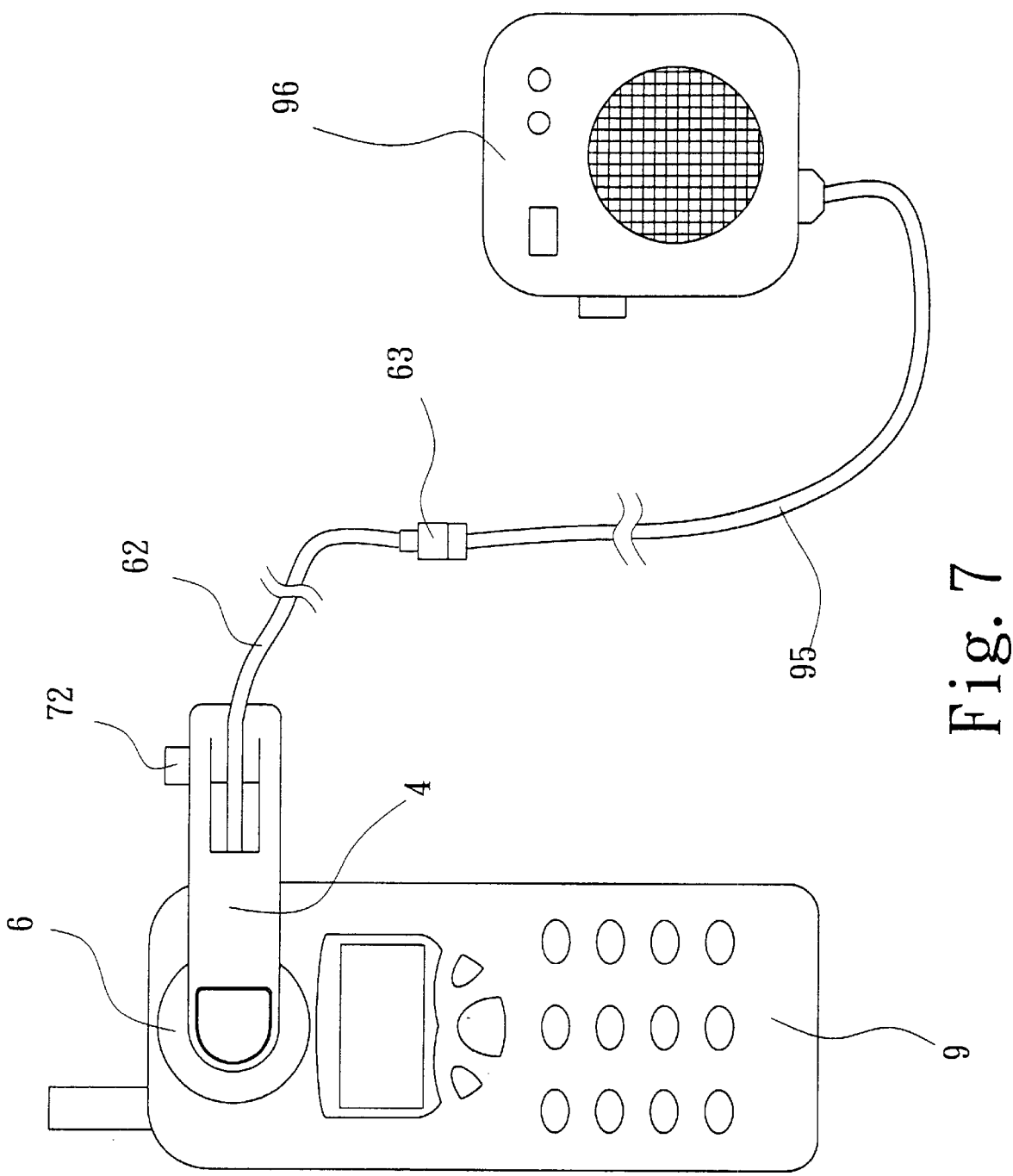
FIG. 7 is an application example of this invention.

Referring to FIG. 7, when clamping this invention at a mobile phone set 9 is desired, a user is supposed firstly to press the protruding part 72 of the weight block 7 to detach the engaged internal annular tooth sets 47, 71 apart for easy adjustment of the included angle and positions of the upper and the lower clamping arm 4, 5 to a preferable condition; then release the protruding part 72 to have the position of those two clamping arms fixed by taking advantage of the humanized design of this invention. The sound or voice of the mobile phone set is collected by the sound pickup cup 6, then transmitted to the microphone in the coupling 63 via the pipeline 62, and finally, the processed and amplified audio signal will be broadcasted through the speaker 96 via a conductive cord 95.

Although, this invention has been described in terms of preferred embodiments, it is apparent that numerous variations and modifications may be made without departing from the true spirit and scope thereof, as set forth in the following claims.

What is claimed is:

1. A clamp-to-combine sound collector assembly, comprising:
   an upper clamping arm having a slip receptacle and a fixing piece disposed at a front end and a downwardly extended tail end thereof respectively, wherein a bearing socket is secured to the fixing piece transversely; a circular shaft receptacle is formed in the bearing socket; an annular tooth set is aligned on an inner bottom face of the circular shaft receptacle, and, a through hole is also reserved in the circular shaft receptacle;
   a lower clamping arm having a tail end extended upwardly to form a fixing piece, which stands oppositely to the fixing piece of the upper clamping arm, wherein a shaft bushing is secured transversely to the fixing piece of the lower clamping arm for being inserted coincidentally in the circular shaft receptacle of the upper clamping arm, and a polygonal store cavity is formed in center of the shaft bushing;
   a sound pickup cup, which is substantially a conic hollow body disposed in a slip receptacle of the upper clamping arm, and provided with a pipeline for extending outwardly;
   a weight block, which is substantially a polygonal solid body disposed between the store cavity of the lower clamping arm and the circular shaft receptacle of the upper clamping arm, wherein an annular tooth set is formed on a right face of the weight block for engaging with the annular tooth set in the circular shaft of the upper clamping arm, and a protruding part disposed in center of a right end of the weight block penetrates the through hole of the circular shaft receptacle to poke outwardly; and
   a spring loaded in the store cavity of the lower clamping arm having one end propped against the weight block for keeping engagement of the annular tooth set of the weight block with the annular tooth set in the circular shaft receptacle under normal conditions;
   by abovesaid arrangement, the internal annular tooth sets being detached apart when the protruding part of the weight block is depressed so that the opening and closing angle of the upper and the lower clamping arm can be adjusted easily, or, the relative position of those two clamping arms can be fixed because of the engagement of the annular tooth sets when the protruding part is released.

2. The clamp-to-combine sound collector assembly according to claim 1, wherein a plurality of clamping pieces is disposed along the circumference of the shaft receptacle of the upper clamping arm, and a triangular barb is attached to each tip of the clamping pieces.

3. The clamp-to-combine sound collector assembly according to claim 2, wherein four discrete clamping pieces are equally distributed along the circumference of the shaft receptacle of the upper clamping arm.

4. The clamp-to-combine sound collector assembly according to claim 1, wherein a recessed annular groove is formed in the bottom rim of the shaft bushing of the lower clamping arm for the tip barbs of the clamping pieces to snap at to further keep the relative position of the upper and the lower clamping arm.

5. The clamp-to-combine sound collector assembly according to claim 1, wherein the slip receptacle further comprises three portions, from the top to the bottom, namely, a circular snap recess in a largest scale, a neck section, and a conical cavity, wherein the snap recess is shaped correspondingly with a top portion of the sound pickup cup, the neck section is shrinked to prevent the sound pickup cup from escaping, and the conical cavity is tapered upwardly to match the shape of the sound pickup cup and thereby allow the latter to locate at the slip receptacle of the upper clamping arm.

6. The clamp-to-combine sound collector assembly according to claim 1, wherein the cutaway section of the top end of the sound pickup cup resembles character T, and the top end is to be retained at the snap recess of the slip receptacle of the upper clamping arm when assembling.

7. The clamp-to-combine sound collector assembly according to claim 1, wherein a penetrable wire entry is arranged permitting a pipeline of the sound pickup cup to be extended outwardly.

8. The clamp-to-combine sound collector assembly according to claim 1, wherein a bumper, which is made of a soft material, such as sponge or the like, is arranged at the front end of the lower clamping arm.

9. The clamp-to-combine sound collector assembly according to claim 1, wherein the store cavity of the lower clamping arm is a hexagonal recessed body while the weight block is a hexagonal solid body so that the weight block can move in the store cavity transversely without rotation.

10. The clamp-to-combine sound collector assembly according to claim 1, wherein a circular cavity is recessively formed in the left end of the weight block, and when assembling, two ends of the spring prop against the inner bottom face of the store cavity of the lower clamping arm and that of the circular cavity of the weight block respectively.

* * * * *